(12) United States Patent
Jiang et al.

(10) Patent No.: US 11,347,726 B2
(45) Date of Patent: May 31, 2022

(54) CROSS-CHAIN TRANSACTION METHOD AND APPARATUS

(71) Applicant: Huawei Technologies Co., Ltd., Shenzhen (CN)

(72) Inventors: Yaoguo Jiang, Nanjing (CN); Feihu Jiang, Nanjing (CN); Ruifeng Hu, Nanjing (CN); Haiyang Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

(21) Appl. No.: 16/787,669

(22) Filed: Feb. 11, 2020

(65) Prior Publication Data
US 2020/0175003 A1 Jun. 4, 2020

Related U.S. Application Data

(63) Continuation of application No. PCT/CN2018/099348, filed on Aug. 8, 2018.

(30) Foreign Application Priority Data

Aug. 29, 2017 (CN) .......................... 201710756457.9

(51) Int. Cl.
*G06F 16/23* (2019.01)
*G06Q 20/38* (2012.01)
*G06Q 10/10* (2012.01)

(52) U.S. Cl.
CPC ...... *G06F 16/2379* (2019.01); *G06F 16/2365* (2019.01); *G06Q 10/10* (2013.01); *G06Q 20/389* (2013.01)

(58) Field of Classification Search
None
See application file for complete search history.

(56) References Cited

U.S. PATENT DOCUMENTS

2017/0193464 A1    7/2017  Sher
2017/0345011 A1*  11/2017  Salami ................. G06Q 20/42
(Continued)

FOREIGN PATENT DOCUMENTS

CN    105976232 A    9/2016
CN    106780025 A    5/2017
(Continued)

OTHER PUBLICATIONS

Mazumdar et al. "Design of Anonymous Endorsement System in Hyperledger Fabric". IEEE Transactions on Emerging Topics in Computing, DOI: 10.1109/TETC.2019.2920719. Published Jun. 5, 2019. URL Link: <https://eprint.iacr.org/2019/753.pdf>. Accessed Nov. 2021. (Year: 2019).*

(Continued)

*Primary Examiner* — Irene Baker
(74) *Attorney, Agent, or Firm* — Conley Rose, P.C.

(57) ABSTRACT

A cross-chain transaction method and apparatus. For any node on a first blockchain of blockchains on which a plurality of associated transactions occur, after receiving an association transaction from a consensus node, the node needs to determine, based on an identifier of an anchor transaction included in the association transaction, whether the anchor transaction is a valid transaction. If the anchor transaction is a valid transaction, the node writes a transaction that occurs in the first blockchain into the first blockchain based on identifiers of the blockchains on which the plurality of transactions occur, to ensure that the plurality of associated transactions on the plurality of blockchains are successfully submitted simultaneously.

20 Claims, 8 Drawing Sheets

(56) References Cited

U.S. PATENT DOCUMENTS

| | | | |
|---|---|---|---|
| 2018/0075028 A1* | 3/2018 | Ruschin | G06Q 10/00 |
| 2018/0114218 A1* | 4/2018 | Konik | H04L 9/3236 |
| 2018/0165476 A1* | 6/2018 | Carey | G06F 21/577 |
| 2018/0285839 A1* | 10/2018 | Yang | G06Q 20/40 |
| 2019/0171849 A1* | 6/2019 | Assenmacher | H04L 69/04 |
| 2019/0244227 A1* | 8/2019 | Inoue | H04L 63/123 |
| 2019/0296915 A1* | 9/2019 | Lancashire | G06Q 20/3825 |
| 2019/0342078 A1 | 11/2019 | Li | |
| 2019/0394179 A1* | 12/2019 | Androulaki | H04L 63/0471 |

FOREIGN PATENT DOCUMENTS

| | | |
|---|---|---|
| CN | 106899698 A | 6/2017 |
| CN | 106936589 A | 7/2017 |
| CN | 106960388 A | 7/2017 |
| CN | 107018125 A | 8/2017 |
| CN | 107085810 A | 8/2017 |
| KR | 101701131 B1 | 2/2017 |

OTHER PUBLICATIONS

Joshi. "8 blockchain consensus mechanisms you should know about". Allerin. Published Apr. 23, 2019. URL Link: <https://www.allerin.com/blog/8-blockchain-consensus-mechanisms-you-should-know-about>. Accessed Nov. 2021. (Year: 2019).*

Cryptopedia Staff. "Blockchain Consensus Mechanisms Beyond Proof of Work and Proof of Stake". Cryptopedia. Published Aug. 11, 2021. URL Link: <https://www.gemini.com/cryptopedia/blockchain-consensus-mechanism-types-of-algorithm>. Accessed Nov. 2021. (Year: 2021).*

Gao, Z., "Introduction of cross-chain technology of blockchain",Fintech Forum, Nov. 30, 2016, 7 pages.

Buterin, V., "Chain Interoperability," XP055511899, Retrieved from the Internet: URL:http://www.r3cev.com/s/Chain-Interoperability-8g6f.pdf [retrieved on Oct. 2, 2018], Sep. 9, 2016, 25 pages.

* cited by examiner

CROSS-CHAIN TRANSACTION METHOD AND APPARATUS

CROSS-REFERENCE TO RELATED APPLICATIONS

This application is a continuation of International Patent Application No. PCT/CN2018/099348, filed on Aug. 8, 2018, which claims priority to Chinese Patent Application No. 201710756457.9, filed on Aug. 29, 2017. The disclosures of the aforementioned applications are hereby incorporated by reference in their entireties.

TECHNICAL FIELD

The present disclosure relates to the field of blockchain technologies, and in particular, to a cross-chain transaction method and apparatus.

BACKGROUND

In a blockchain system, all data is stored in blocks. Newly written data forms a new block, and is added to the end of a current blockchain. When storing data, each block also needs to store a number (usually a hash value of all recorded data) that uniquely corresponds to all recorded data in a previous block, to form a chain. Therefore, the blockchain system may be considered as a system in which computers in a distributed network that do riot completely trust each other follow a consensus protocol to maintain a set of traceable and tamper-proof chain data together.

There are a plurality of possible scenarios of cross-chain transactions between blockchains. For example, in a scenario 1, a user A on a blockchain 1 pays several assets to a user B on a blockchain 2, and in a scenario 2, a user E initiates a transaction a and a transaction b respectively on a blockchain 1 and a blockchain 2. The transaction a and the transaction b are associated.

Using the scenario 1 as an example, an implementation solution in other approaches is: After negotiation, the user A and the user B determine a user C who has assets on both the blockchains to act as an intermediary. The user A initiates a transaction (transfers an asset) to Escrow on the blockchain 1. The user C initiates a transaction to Escrow on the blockchain 2. Escrow has assets on both the blockchains and is similar to a trusted neutral broker. After determining that both the transactions are completed, Escrow transfers the corresponding assets to the user C and the user B respectively in the two blockchains. However, because the solution relies on the intermediary for implementation, Escrow needs to initiate payment transactions respectively to the user C and the user B on the two blockchains. If either transaction fails for some reason, the successful one needs to be revoked. However, the successful transaction may be irrevocable. As a result, atomic submission of associated transactions to two blockchains fails to be fully implemented.

In conclusion, a cross-chain transaction method is urgently needed at present to implement atomic submission of associated transactions to a plurality of blockchains.

SUMMARY

This application provides a cross-chain transaction method to implement atomic submission of associated transactions to a plurality of blockchains.

According to a first aspect, this application provides a cross-chain transaction method, including: receiving, by a node, an association transaction sent by a consensus node, where the association transaction includes transaction content of a plurality of transactions, identifiers of blockchains on which the plurality of transactions occur, and an identifier of an anchor transaction, the node is any node on a first blockchain, and the first blockchain is any blockchain of the blockchains on which the plurality of transactions occur; and writing, by the node, a transaction that occurs in the first blockchain into the first blockchain based on the identifiers of the blockchains on which the plurality of transactions occur if determining, based on the identifier of the anchor transaction, that the anchor transaction is a valid transaction.

In this way, for any node on the first blockchain of the blockchains on which the plurality of associated transactions occur, after receiving the association transaction sent by the consensus node, the node needs to determine, based on the identifier of the anchor transaction included in the association transaction, whether the anchor transaction is a valid transaction, and if the anchor transaction is a valid transaction, writes the transaction that occurs in the first blockchain into the first blockchain based on the identifiers of the blockchains on which the plurality of transactions occur, to ensure that the plurality of associated transactions on the plurality of blockchains are successfully submitted simultaneously, and effectively avoid problems in other approaches that a plurality of transactions fail to be submitted simultaneously and a successful transaction may be irrevocable. In addition, according to the method in this application, because the plurality of transactions are atomic, it is not necessary to design an intermediate status and a rollback transaction based on a specific service type, thereby effectively resolving a problem in other approaches that it is difficult to design an intermediate status and a rollback transaction when service logic is relatively complex.

In a possible design, if determining that the anchor transaction is an invalid transaction, the node discards the association transaction.

In a possible design, before the node determines that the anchor transaction is an invalid transaction, the method further includes: receiving, by the node, an invalid anchor transaction sent by the consensus node, where the invalid anchor transaction includes the identifier of the anchor transaction; and setting, by the node, the anchor transaction to the invalid transaction based on the invalid anchor transaction.

In a possible design, before the node receives the association transaction sent by the consensus node, the method further includes: receiving, by the node, the anchor transaction sent by the consensus node, and writing the anchor transaction into the first blockchain.

In a possible design, the node is a node common to the blockchains on which the plurality of transactions occur; and before the node receives the association transaction sent by the consensus node, the method further includes: sending, by the node, the anchor transaction corresponding to the plurality of transactions to the consensus node, where the anchor transaction includes data identifiers of the plurality of transactions, the identifiers of the blockchains on which the plurality of transactions occur, and an anchor version number; and sending, by the node, the association transaction to the consensus node after determining that the anchor transaction succeeds.

In a possible design, sending, by the node, the anchor transaction to the consensus node includes sending, by the node, an anchor request corresponding to the plurality of transactions to a notary node, where the anchor request is used to request the notary node to generate the anchor transaction and send the anchor transaction to the consensus node.

In a possible design, sending, by the node, the association transaction to the consensus node after determining that the anchor transaction succeeds includes: receiving, by the node, anchor indication information sent by the notary node, where the anchor indication information is used to indicate that the anchor transaction succeeds, and the anchor indication information includes the identifier of the anchor transaction and an identifier of the anchor request; determining, by the node, the plurality of transactions corresponding to the anchor request based on the identifier of the anchor request; and sending the association transaction to the consensus node based on the plurality of transactions.

According to a second aspect, this application provides a cross-chain transaction method, including: receiving, by a consensus node, an anchor transaction sent by a node, where the anchor transaction includes data identifiers of the plurality of transactions and identifiers of blockchains on which the plurality of transactions occur; and monitoring, by the consensus node, data corresponding to the data identifiers, and broadcasting an invalid anchor transaction to nodes on the blockchains on which the plurality of transactions occur if detecting that the data corresponding to the data identifiers is modified, where the invalid anchor transaction includes identifier information of the anchor transaction, and the invalid anchor transaction is used to indicate that the anchor transaction is an invalid transaction.

In this way, the consensus node receives the anchor transaction sent by the node, monitors the data corresponding to the data identifiers in the anchor transaction, and notifies the nodes of a detection result after detecting that the data is modified, to make the nodes fail, based on the detection result, in submitting the plurality of associated transactions simultaneously, such that the plurality of transactions are atomic.

In a possible design, the anchor transaction further includes an anchor version number; and that the consensus node detects that the data is modified includes: receiving, by the consensus node, another transaction, where the other transaction is a transaction that is not associated with the plurality of transactions, and the other transaction includes a version number of the data corresponding to the data identifiers; and detecting, by the consensus node, that the data is modified if determining that the version number included in the other transaction is different from the anchor version number.

In a possible design, after the consensus node receives the anchor transaction sent by the node, the method further includes broadcasting, by the consensus node based on the identifiers of the blockchains on which the plurality of transactions occur, the anchor transaction to nodes on blockchains on which the anchor data is located.

In a possible design, after broadcasting, by the consensus node, the anchor transaction to the nodes on the blockchains on which the plurality of transactions occur, the method further includes: receiving, by the consensus node, an association transaction sent by the node, where the association transaction includes transaction content of the plurality of transactions, the identifiers of the blockchains on which the plurality of transactions occur, and an identifier of the anchor transaction; and broadcasting, by the consensus node based on the identifiers of the blockchains on which the plurality of transactions occur, the association transaction to the nodes on the blockchains on which the plurality of transactions occur.

According to a third aspect, this application provides a cross-chain transaction system, where the cross-chain transaction system includes a plurality of consensus nodes and nodes on blockchains on which a plurality of associated transactions occur, the nodes on the blockchains on which the plurality of associated transactions occur include a connection node, and the connection node is a node common to the blockchains on which the plurality of associated transactions occur. The connection node is configured to send an anchor transaction to the consensus node, where the anchor transaction includes data identifiers of the plurality of transactions, identifiers of the blockchains on which the plurality of transactions occur, and an anchor version number. The consensus node is configured to: receive the anchor transaction sent by the node, monitor data corresponding to the data identifiers; and broadcast an invalid anchor transaction to the nodes on the blockchains on which the plurality of transactions occur if detecting that the data corresponding to the data identifiers is modified, where the invalid anchor transaction includes identifier information of the anchor transaction, and the invalid anchor transaction is used to indicate that the anchor transaction is an invalid transaction. The connection node is further configured to send an association transaction to the consensus nod where the association transaction includes transaction content of the plurality of transactions, the identifiers of the blockchains on which the plurality of transactions occur, and an identifier of the anchor transaction. The consensus node is further configured to: receive the association transaction sent by the node; and broadcast, based on the identifiers of the blockchains on which the plurality of transactions occur, the association transaction to the nodes on the blockchains on which the plurality of transactions occur. The nodes on the blockchains on which the plurality of transactions occur are configured to: receive the association transaction; and write the association transaction into blockchains maintained by the nodes if determining, based on the identifier of the anchor transaction, that the anchor transaction is a valid transaction.

According to a fourth aspect, this application provides a server, where the server is a server on which any node on a first blockchain is located. The server includes: a transceiver module configured to receive an association transaction sent by a consensus node, where the association transaction includes transaction content of a plurality of transactions, identifiers of blockchains on which the plurality of transactions occur, and an identifier of an anchor transaction, and the first blockchain is any blockchain of the blockchains on which the plurality of transactions occur; and a processing module configured to write a transaction that occurs in the first blockchain into the first blockchain based on the identifiers of the blockchains on which the plurality of transactions occur if determining, based on the identifier of the anchor transaction, that the anchor transaction is a valid transaction.

In a possible design, if determining that the anchor transaction is an invalid transaction, the server discards the association transaction.

In a possible design, the transceiver module is further configured to receive an invalid anchor transaction sent by the consensus node, where the invalid anchor transaction includes the identifier of the anchor transaction. The processing module is further configured to set the anchor transaction to the invalid transaction based on the invalid anchor transaction.

In a possible design, before receiving the association transaction sent by the consensus node, the transceiver module is further configured to receive the anchor transaction sent by the consensus node. The processing module is further configured to write the anchor transaction into the first blockchain.

In a possible design, the server is a server on which a node common to the blockchains on which the plurality of transactions occur is located. Additionally, before receiving the association transaction sent by the consensus node, the transceiver module is further configured to: send the anchor transaction corresponding to the plurality of transactions to the consensus node, where the anchor transaction includes data identifiers of the plurality of transactions, the identifiers of the blockchains on which the plurality of transactions occur, and an anchor version number; and send the association transaction to the consensus node after determining that the anchor transaction succeeds.

In a possible design, the transceiver module is further configured to send, by the node, an anchor request corresponding to the plurality of transactions to a notary node, where the anchor request is used to request the notary node to generate the anchor transaction and send the anchor transaction to the consensus node.

In a possible design, the transceiver module is configured to: receive anchor indication information sent by the notary node, where the anchor indication information is used to indicate that the anchor transaction succeeds, and the anchor indication information includes the identifier of the anchor transaction and an identifier of the anchor request; determine the plurality of transactions corresponding to the anchor request based on the identifier of the anchor request; and send the association transaction to the consensus node based on the plurality of transactions.

According to a fifth aspect, this application provides a server, where the server is a server on which a consensus node is located. The server includes: a transceiver module configured to receive an anchor transaction sent by a node, where the anchor transaction includes data identifiers of the plurality of transactions and identifiers of blockchains on which the plurality of transactions occur; and a processing module configured to: monitor data corresponding to the data identifiers; and broadcast, using the transceiver module, an invalid anchor transaction to nodes on the blockchains on which the plurality of transactions occur if detecting that the data corresponding to the data identifiers is modified, where the invalid anchor transaction includes identifier information of the anchor transaction, and the invalid anchor transaction is used to indicate that the anchor transaction is an invalid transaction.

In a possible design, the anchor transaction further includes an anchor version number; and the transceiver module is further configured to: receive another transaction, where the other transaction is a transaction that is not associated with the plurality of transactions, and the other transaction includes a version number of the data corresponding to the data identifiers. The processing module is further configured to detect that the data corresponding to the data identifiers is modified if determining that the version number included in the other transaction is different from the anchor version number.

In a possible design, after receiving the anchor transaction sent by the node, the transceiver module is further configured to broadcast, based on the identifiers of the blockchains on which the plurality of transactions occur, the anchor transaction to nodes on blockchains on which the anchor data is located.

In a possible design, after broadcasting the anchor transaction to the nodes on the blockchains on which the plurality of transactions occur, the transceiver module is further configured to: receive an association transaction sent by the node, where the association transaction includes transaction content of the plurality of transactions, the identifiers of the blockchains on which the plurality of transactions occur, and an identifier of the anchor transaction; and broadcast, based on the identifiers of the blockchains on which the plurality of transactions occur, the association transaction to the nodes on the blockchains on which the plurality of transactions occur.

According to a sixth aspect, this application further provides a server, where the server has a function in a method example in the foregoing fourth aspect, and the communications apparatus includes a communications module and a processor. The communications module is configured to communicatively interact with another device, where the communications module may be a radio frequency (RF) circuit, a Wi-Fi module, a communications interface, a Bluetooth module, or the like. The processor is configured to implement a function of the processing module in the foregoing fourth aspect.

Optionally, the communications apparatus may further include a memory configured to store a program, and the like. The program may include program code, and the program code includes an instruction. The memory may include a random-access memory (RAM), and may further include a non-volatile memory, for example, at least one magnetic disk memory. The processor executes an application program stored in the memory, such that the server implements the foregoing function.

In a possible manner, the communications module, the processor, and the memory may be connected to each other using the bus. The bus may be a bus of a peripheral component interconnect (PCI) standard, a bus with an extended industry standard architecture (EISA), or the like. The bus may include an address bus, a data bus, a control bus, and the like.

According to a seventh aspect, this application further provides a server, where the server has a function in a method example in the foregoing fifth aspect, and the communications apparatus includes a communications module and a processor. The communications module is configured to communicatively interact with another device, where the communications module may be an RF circuit, a Wi-Fi module, a communications interface, a Bluetooth module, or the like. The processor is configured to implement a function of the processing module in the foregoing fifth aspect.

Optionally, the communications apparatus may further include a memory, configured to store a program, and the like. The program may include program code, and the program code includes an instruction. The memory may include a RAM, and may further include a non-volatile memory, for example, at least one magnetic disk memory. The processor executes an application program stored in the memory, such that the server implements the foregoing function.

In a possible manner, the communications module, the processor, and the memory may be connected to each other using the bus. The bus may be a bus of a peripheral component interconnect (PCI) standard, a bus with an extended industry standard architecture (EISA), or the like. The bus may include an address bus, a data bus, a control bus, and the like.

This application further provides a computer-readable storage medium, where the storage medium stores an instruction, and when running on a computer, the instruction enables the computer to perform the cross-chain transaction method provided in any one of the foregoing designs.

This application further provides a computer program product including an instruction, and when running on a computer, the computer program product enables the computer to perform the cross-chain transaction method provided in any one of the foregoing designs.

This application further provides a computer program, and when running on a computer, the computer program enables the computer to perform the cross-chain transaction method provided in any one of the foregoing designs.

DESCRIPTION OF EMBODIMENTS

This application is described below in detail with reference to the accompanying drawings of the specification.

Figure 1:
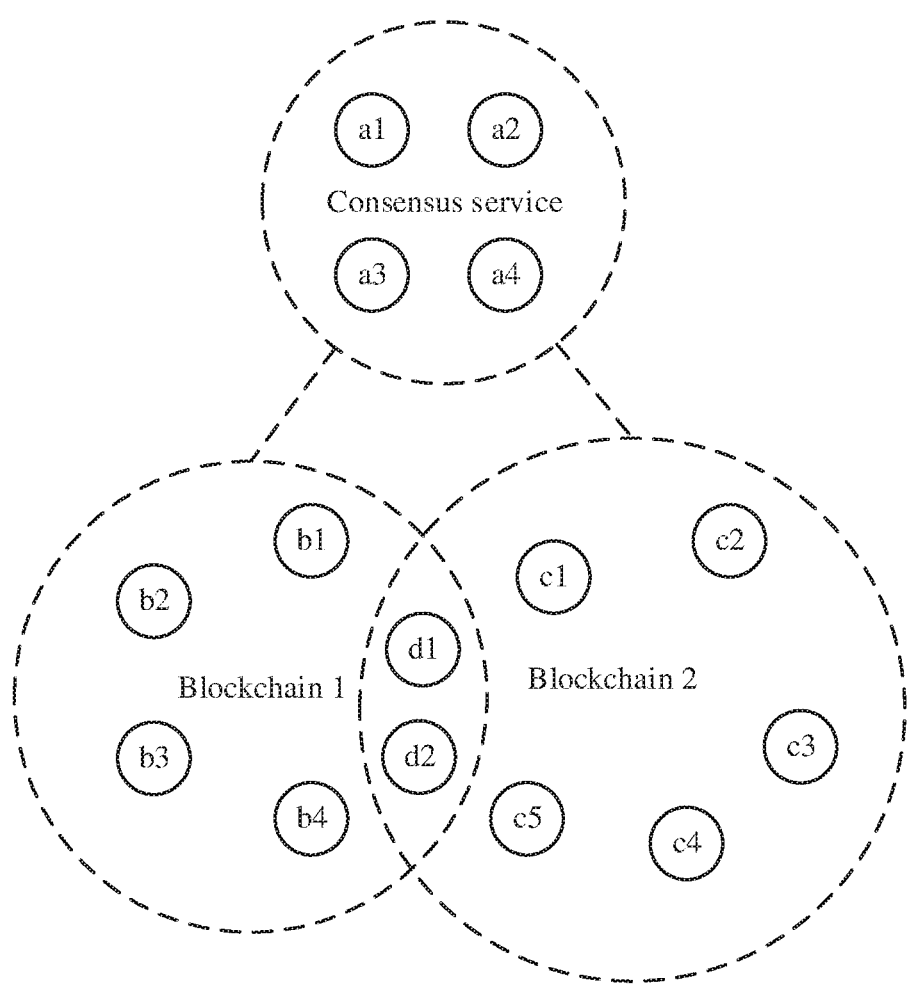
FIG. 1 is a schematic diagram of a system architecture to which this application is applicable.

A cross-chain transaction method in this application is applicable to various system architectures. FIG. 1 is a schematic diagram of a system architecture to which this application is applicable. The system architecture may include a consensus service network, and two or more blockchain networks, for example, a first blockchain network and a second blockchain network that are shown in FIG. 1. The consensus service network may include a plurality of consensus nodes, for example, a consensus node a1, a consensus node a2, a consensus node a3, and a consensus node a4 shown in FIG. 1, that have a consensus function. In the architecture shown in FIG. 1, the first blockchain network and the second blockchain network share consensus services provided by the consensus nodes in the consensus service network.

A blockchain network is a peer to peer (P2P) network formed by a plurality of nodes. P2P is an application layer protocol running on a transmission control protocol (TCP). Nodes in the blockchain network are equivalent to each other. There is no central node in the network, and each node may be randomly connected to another node.

Because the blockchain network is a P2P distributed network, it is a relatively slow process to check a transaction record and reach a consensus among many nodes. However, during actual application, a relatively fast transaction speed is required in many scenarios. One relatively fast consensus mechanism is proof of endorse (PoE). The core of the consensus mechanism lies in that a plurality of endorsers in the blockchain network execute a smart contract and endorse a contract execution result (content of a contract execution result of a specific endorser is signed to ensure that a result is sent by the endorser). A user may set, according to an actual requirement, endorsers that need to be trusted for a smart contract of the user and a verification policy of a plurality of contract execution results. For example, an execution proposal for a smart contract may be sent to three endorsers. The verification policy may require that three contract execution results have consistent content or require that at least two contract execution results have consistent content. A client device collects the contract execution results returned by the endorsers, adds the contract execution results to a transaction, and broadcasts the contract execution results to all nodes (including the endorsers) in the blockchain network using a consensus service network. The nodes check the received transaction, and if the transaction meets the verification policy, the nodes accept modifications to data by the transaction, and write the transaction into a blockchain.

During actual execution, the entire blockchain network is distributed, leading to time differences in data synchronization. Data obtained by an endorser when the endorser executes code of a smart contract of a transaction is probably inconsistent with data that exists when the transaction is eventually to be issued into a blockchain, leading to an endorsement failure of the endorser. To resolve the problem, an auto-increment version number may be set for each piece of data of a smart contract, and the version number of the data is updated when the data is updated.

As shown in FIG. 1, the first blockchain network includes a node b1, a node b2, a node b3, a node b4, a node d1, and a node d2. The nodes maintain a blockchain 1 together. The second blockchain network includes a node c1, a node c2, a node c3, a node c4, a node c5, the node d1, and the node d2. The nodes maintain a blockchain 2 together. A blockchain stores a list of transactions in blocks. Blocks on the blockchain are generated in chronological order, and each block is used to record a list of transactions generated within a period of time. A list of all transactions recorded on the blockchain is a ledger. For example, a ledger recorded on the blockchain 1 is a Ledger 1, and a ledger recorded on the blockchain 2 is a Ledger 2. In this application, a ledger and a blockchain may be equivalent and interchangeable concepts without causing ambiguity.

It should be noted that the foregoing system architecture is merely a logical example. Physically, a node on a blockchain network is on a physical machine (server), or a plurality of nodes in a plurality of blockchain networks are on a same server. A node may be a process or a series of processes that run on a server. For example, the node b1 in the first blockchain network and the node c1 in the second blockchain network may be two processes running on a server.

The node described in this application may be a server on which the node is located.

Further, one or more clients may communicate with a node by accessing a network. For example, if a user A has an asset on the blockchain 1, the user A may communicate with any node in the first blockchain network using a client a, to initiate a transaction on the blockchain 1. If a user B has an asset on the blockchain 2, the user B may communicate with any node in the second blockchain network using a client b, to initiate a transaction on the blockchain 2. If a user C has assets on both the blockchain 1 and the blockchain 2, the user C may communicate with any node in both the first blockchain network and the second blockchain network using a client c, to initiate a transaction on the blockchain 1 or the blockchain 2.

It should be noted that in this application, a client device may be omitted. In this case, a user may directly initiate a transaction on a blockchain using a node on the blockchain, and this is not specifically limited.

Based on the architecture shown in FIG. 1, an asset transaction is conducted between blockchains. For example, in a scenario, the user A on the blockchain 1 pays 100 units of asset to the user B on the blockchain 2. In an implementation in other approaches, a role of Escrow similar to a neutral broker is introduced in each blockchain. The user A and the user B first respectively initiate transactions to Escrow in the two blockchains. After determining that both the transactions are completed, Escrow separately transfers assets to participants on the blockchains. A procedure is as follows.

S1: The user A chooses the user C as an intermediary, where the user C is a user on both the blockchain 1 and the blockchain 2.

S2: On the blockchain 1, the user A transfers an asset to Escrow (referred to as a transaction 1), and in this case, the transaction 1 is in a prepared state.

S3: On the blockchain 2, after learning the transaction of transfer from the user A to Escrow on the blockchain 1 (Prepared), the user C transfers an asset to Escrow (referred to as a transaction 2) on the blockchain 2, and in this case, the transaction 2 is in a prepared state.

S4: After learning that the transaction 2 is in a prepared state, the user B on the blockchain 2 issues a payee signature.

S5: A group of notaries monitor whether the user B on the blockchain 2 has issued a payee signature, and the group of notaries may reach a consensus to output a consistent and reliable result about whether the user B has issued the payee signature before specified expiry. If finding the payee signature of the user B on the blockchain 2, the notaries instruct the blockchain 1 and the blockchain 2 to transfer the assets in Escrow to recipients of the transactions, that is, instruct Escrow to send, on the blockchain 1, the asset to the user C who is the intermediary, and instruct Escrow to send the asset to the user B on the blockchain 2. If failing to find the payee signature of the user B on the blockchain 2, the assets kept by Escrow are returned to initiators of the transactions. For example, Escrow sends the asset to the user A on the blockchain 1, and Escrow sends the asset to the user C on the blockchain 2.

The foregoing solution may expand to asset payment of N blockchains (a blockchain 1→ . . . →a blockchain N). The notaries observe whether a payee on the blockchain N has issued a payee signature, to instruct Escrow to send escrowed assets to recipients of transactions or return the assets to initiators of the transactions on all the blockchains.

In the foregoing implementation, Escrow needs to initiate payment transactions respectively to the user C and the user B on the two blockchains. If either transaction fails for some reason, the successful one needs to be revoked. However, the successful transaction may be irrevocable. As a result, transaction security is relatively poor.

Based on this, this application provides a cross-chain transaction method. For any node on a first blockchain of blockchains on which a plurality of associated transactions occur, after receiving an association transaction sent by a consensus node, the node needs to determine, based on an identifier of an anchor transaction included in the association transaction, whether the anchor transaction is a valid transaction, and if the anchor transaction is a valid transaction, writes a transaction that occurs in the first blockchain into the first blockchain based on identifiers of the blockchains on which the plurality of transactions occur, to ensure that the plurality of associated transactions on the plurality of blockchains are successfully submitted simultaneously, and effectively avoid problems in other approaches that a plurality of transactions fail to be submitted simultaneously and a successful transaction may be irrevocable. In addition, according to the method in this application, because the plurality of transactions are atomic, it is not necessary to design an intermediate status and a rollback transaction based on a specific service type, thereby effectively resolving a problem in other approaches that it is difficult to design an intermediate status and a rollback transaction when service logic is relatively complex.

To describe this application clearly, a node that may conduct an association transaction on a plurality of blockchains (for example, the blockchain 1 and the blockchain 2 in FIG. 1) may be referred to as a connection node (connect peer), and a node that may perform endorsement for data transacted on the plurality of blockchains may be referred to as a notary node (notary peer). The connection node and the notary node are both nodes common to the blockchain 1 and the blockchain 2. The notary node is a node specified in advance from nodes common to a plurality of blockchains and is configured to provide third-party notarization. The notary node can receive transaction information of the plurality of blockchains.

Embodiment 1

Figure 2A:
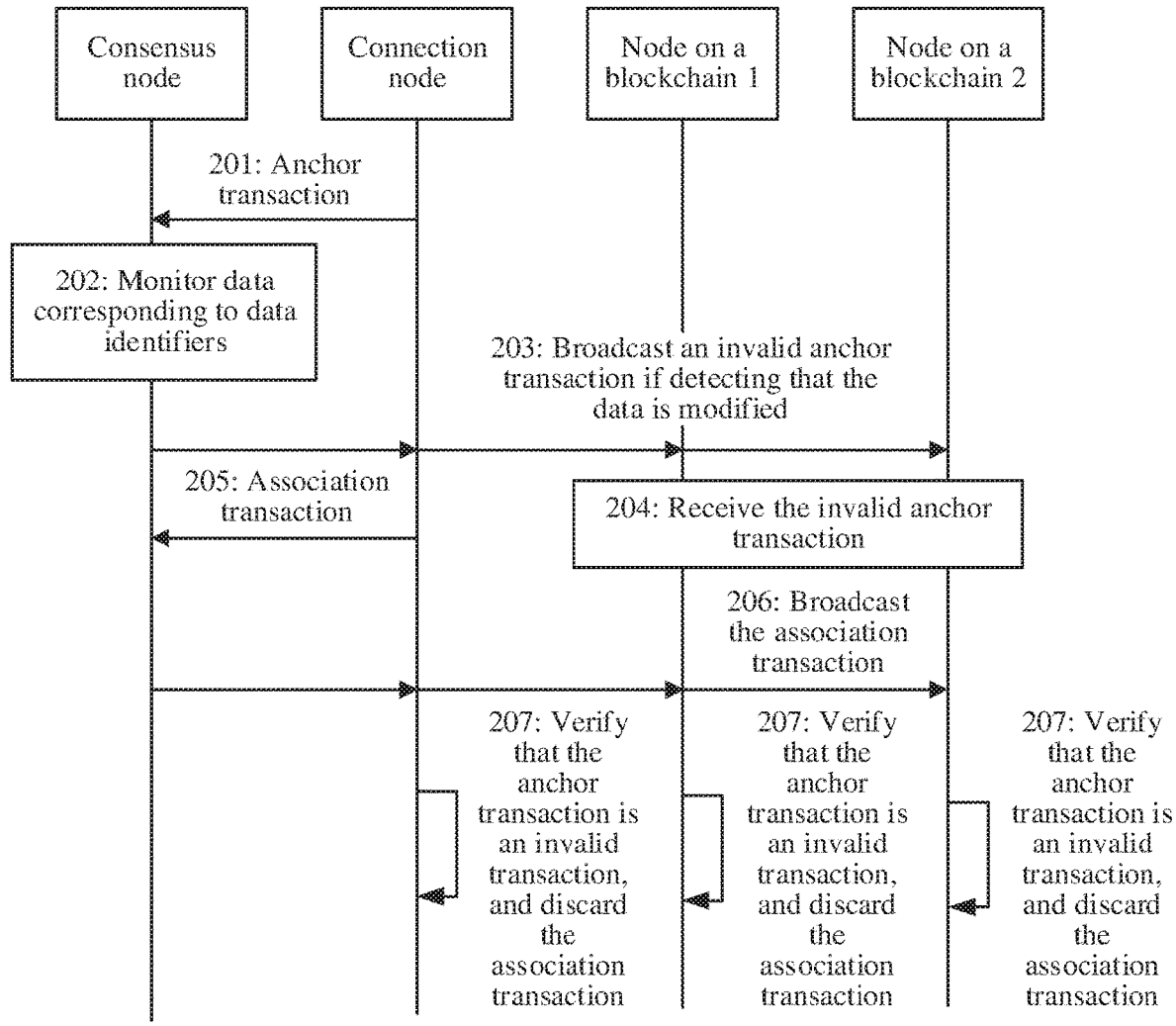
FIG. 2A is a schematic flowchart of a cross-chain transaction according to Embodiment 1 of this application.

Based on the system architecture shown in FIG. 1, FIG. 2A is a schematic flowchart corresponding to a cross-chain transaction method according to Embodiment 1 of this application. As shown in FIG. 2A, the method includes the following steps.

Step 201: A connection node generates an anchor transaction corresponding to a plurality of transactions based on the plurality of associated transactions, and sends the anchor transaction to a consensus node, where the anchor transaction includes data identifiers of the plurality of transactions, identifiers of blockchains on which the plurality of transactions occur, and an anchor version number.

Herein, the plurality of associated transactions may be two or more associated transactions. Correspondingly, the blockchains on which the plurality of transactions occur are two or more blockchains, for example, a blockchain 1, a blockchain 2, . . . , and a blockchain N, where N is a positive integer.

Using a scenario in which "a user A needs to use an asset of the user A on the blockchain 1 to pay several assets on the blockchain 2 to a user B on the blockchain 2, and selects a user C that has assets on both the blockchains as an intermediary" as an example, the user A, the user B, and the user C negotiate that the user A pays an asset to the user C on the blockchain 1 (a first transaction), and the user C pays an asset to the user B on the blockchain 2 (a second transaction). The first transaction and the second transaction are the plurality of associated transactions. A blockchain on which the first transaction occurs is the blockchain 1, and a blockchain on which the second transaction occurs is the blockchain 2.

The data identifiers of the plurality of transactions are variables of data to be accessed by invoking a smart contract request on the blockchains on which the plurality of transactions occur. The data corresponding to the data identifiers of the plurality of transactions is the data to be accessed by invoking the smart contract request on the blockchains on which the plurality of transactions occur. For example, a data identifier of the first transaction may be an identifier of the user A and an identifier of the user C. Data corresponding to the identifier of the user A is asset data of the user A on the blockchain 1, and data corresponding to the identifier of the user C is asset data of the user C on the blockchain 1.

The anchor version number is a version number of the data to be accessed by invoking the smart contract request on the blockchains on which the plurality of transactions occur.

An identifier of a blockchain may be information, for example, a number of the blockchain, used to uniquely identify the blockchain, and is not specifically limited.

Further, in this application, the plurality of associated transactions may carry a same association identifier. After generating the anchor transaction corresponding to the plurality of transactions, the connection node may establish and store a correspondence between an identifier of the anchor transaction and the association identifier carried in the plurality of transactions. There may be a plurality of storage manners, for example, storage in a form of a data table, as shown in Table 1.

TABLE 1

Example of a correspondence between an association identifier of a plurality of transactions and an identifier of an anchor transaction

| Association identifier | Identifier of an anchor transaction |
|---|---|
| Association identifier 1 | Anchor transaction 1 |
| Association identifier 2 | Anchor transaction 2 |
| ... | ... |

Step 202: The consensus node receives the anchor transaction, and monitors the data corresponding to the data identifiers.

In this application, the consensus node implements monitoring in a plurality of manners. For example, the consensus node may implement monitoring by maintaining a local data monitoring table. Each time the consensus node sends an anchor transaction, the consensus node adds the anchor transaction to the data monitoring tablet and when detecting that the data corresponding to the data identifiers is modified, the consensus node removes the anchor transaction from the data monitoring table.

Figure 3:
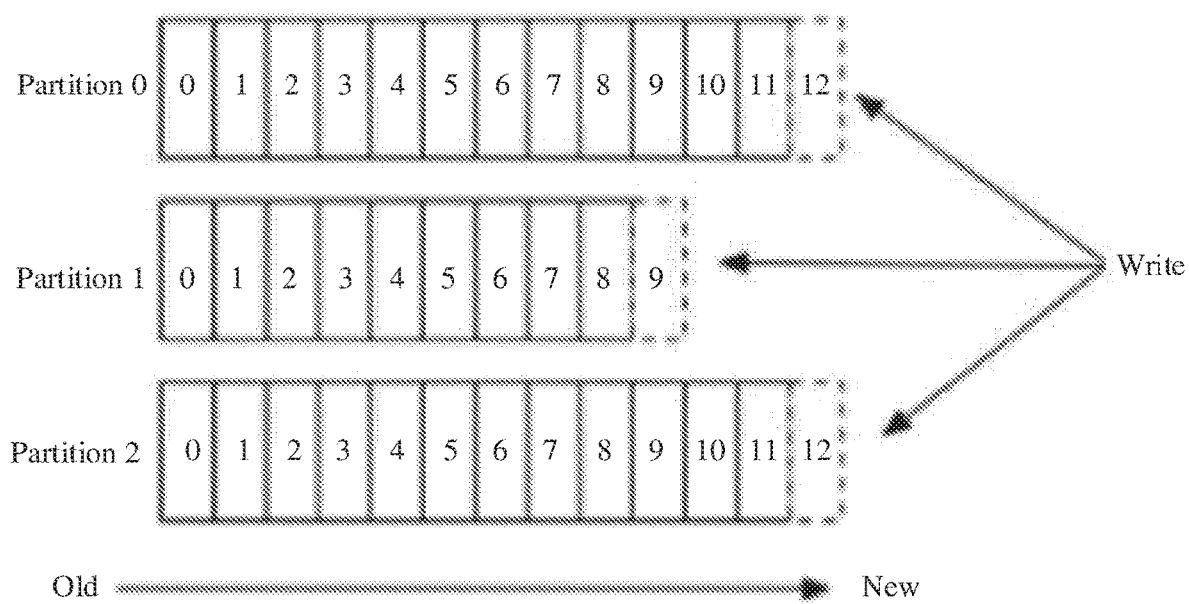
FIG. 3 is a schematic diagram of monitoring by a consensus node in this application.

For example, the consensus node may be implemented using message queuing middleware, and receives, via a same interface, anchor transactions sent by connection nodes. As shown in FIG. 3, the consensus node records, based on the identifiers of the blockchains on which the plurality of transactions in the anchor transaction occur, transaction information into different partitions, for example, a partition 0, a partition 1, and a partition 2, and different partitions correspond to transactions on different blockchains. For example, the partition 0 corresponds to a transaction on the blockchain 1, the partition 1 corresponds to a transaction on the blockchain 2, and the partition 2 corresponds to a transaction on the blockchain 3. Using the partition 0 as an example, numbers (0, 1, 2, . . . , 11, 12, . . . ) in the partition 0 are used to indicate transactions that need to be monitored on the blockchain 1. The consensus node may pack, based on an identifier of a blockchain, transaction information in different partitions into a block, and send the block to a node of the corresponding blockchain.

Step 203: The consensus node broadcasts an invalid anchor transaction to nodes on the blockchains on which the plurality of transactions occur if detecting that the data corresponding to the data identifiers is modified, where the invalid anchor transaction includes identifier information of the anchor transaction, and the invalid anchor transaction is used to indicate that the anchor transaction is an invalid transaction.

In this application, there may be a plurality of cases resulting in modifications to the data corresponding to the data identifiers. For example, the consensus node receives a third transaction (the user A pays an asset to a user D on the blockchain 1). Because the third transaction has modified the asset data of the user A, the data corresponding to the data identifiers is modified. For example, when the third transaction includes a version number of the data corresponding to the data identifiers, if it is determined that the version number included in the third transaction is different from the anchor version number in the anchor transaction, the consensus node detects that the data corresponding to the data identifiers is modified. When the third transaction does not include a version number, if it is determined that a write operation is performed on the data corresponding to the data identifiers in the third transaction, the consensus node detects that the data corresponding to the data identifiers is modified.

After receiving the third transaction, the consensus node detects that the third transaction has modified the data (the asset data of the user A on the blockchain 1) corresponding to the data identifiers in the anchor transaction, records the third transaction into a queue of transactions to be broadcasted on the blockchain 1, immediately adds the invalid anchor transaction to queues of transactions to be broadcasted of the blockchain 1 and the blockchain 2, updates the local data monitoring table, deletes the anchor transaction from the data monitoring table, and no longer monitors anchor data.

Step 204: Nodes on the blockchains on which the plurality of transactions occur receive the invalid anchor transaction sent by the consensus node.

Step 205: The connection node sends an association transaction to the consensus node, where the association transaction includes transaction content of the plurality of transactions, the identifiers of the blockchains on which the plurality of transactions occur, and the identifier of the anchor transaction.

Step 206: The consensus node receives the association transaction, and sends, based on the identifiers of the blockchains on which the plurality of transactions occur, the association transaction to the nodes on the blockchains on which the plurality of transactions occur.

Herein, for the foregoing scenario, after receiving the association transaction, the consensus node may send the association transaction to the nodes on the blockchain 1 and the nodes on the blockchain 2 based on an identifier of the blockchain I on which the first transaction occurs and an identifier of the blockchain 2 on which the second transaction occurs.

Step 207: For any node on the first blockchain of the blockchains on which the plurality of transactions occur, after receiving the association transaction, the node determines, based on the identifier of the anchor transaction included in the association transaction, that the anchor transaction is an invalid transaction, and discards the association transaction.

In this application, the node further needs to locally verify a transaction format, a signature, and the like of the association transaction, and the node can write a transaction that occurs in the first blockchain into the first blockchain only when the transaction format, the signature, and the like are locally verified and the anchor transaction is a valid transaction, Refer to other approaches for specific content of locally verifying the transaction format, the signature, and the like of the association transaction, and details are not described herein again. Further, a sequence of the local verification and the anchor transaction verification is not limited in this application. In a possible implementation, the node may first verify whether the anchor transaction is a valid transaction, and if the anchor transaction is an invalid transaction, the node may directly discard the association transaction and no longer needs to perform validity verification, thereby reducing processing burden.

Herein, the first blockchain is any blockchain of the blockchains on which the plurality of transactions occur, for example, the blockchain 1 or the blockchain 2. For example, after receiving the association transaction, the node on the blockchain 1 and the node on the blockchain 2 determine that the anchor transaction is an invalid transaction based on the identifier of the anchor transaction included in the association transaction and the invalid anchor transaction that is received in step 204, and then discard the association transaction. In this case, the first transaction and the second transaction in the association transaction fail to be submitted simultaneously.

Figure 2B:
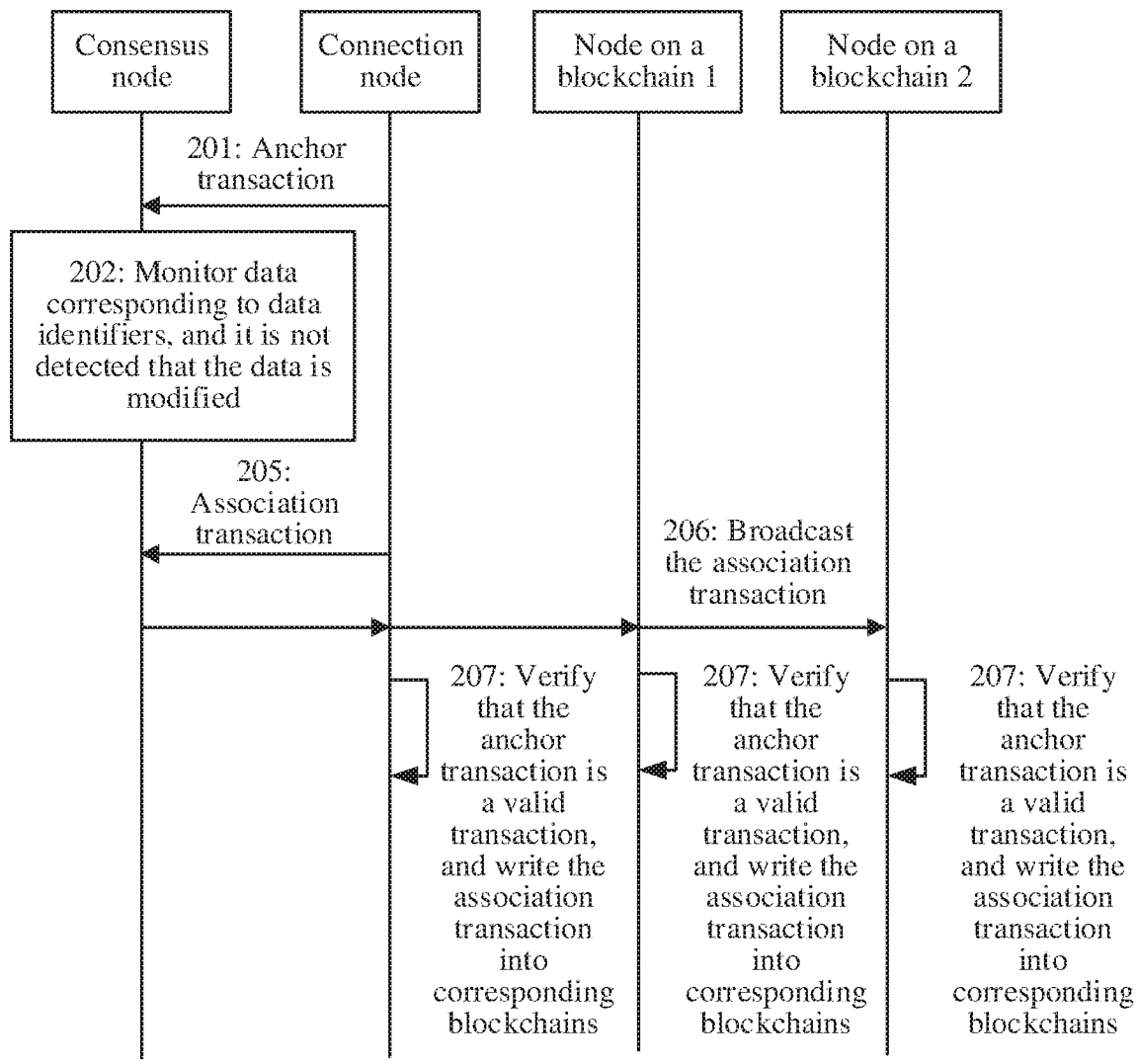
FIG. 2B is a schematic flowchart of another cross-chain transaction according to Embodiment 1 of this application.

It should be noted that, in this application, in step 203, if the consensus node does not detect that the data corresponding to the data identifiers is modified, the consensus node may skip processing. In this way, the nodes on the blockchains on which the plurality of transactions occur do not receive the invalid anchor transaction. Correspondingly, in step 207, after receiving the association transaction, the nodes on the blockchains on which the plurality of transactions occur determine that the anchor transaction is a valid transaction, and write the association transaction into corresponding blockchains. For example, after receiving the association transaction, the node on the blockchain 1 determines that the anchor transaction is a valid transaction, and writes the first transaction into the blockchain 1. After receiving the association transaction, the node on the blockchain 2 determines that the anchor transaction is a valid transaction, and writes the second transaction into the blockchain 2. After receiving the association transaction, the connection node (a node common to the blockchain 1 and the blockchain 2) determines that the anchor transaction is a valid transaction, writes the first transaction into the blockchain 1, and writes the second transaction into the blockchain 2. In this case, the first transaction and the second transaction in the association transaction are successfully submitted simultaneously. Refer to FIG. 2B for a procedure in this case. By comparing a procedure shown in FIG. 2B with that in FIG. 2A, because detection results of the consensus node are different, different execution results are caused. Refer to descriptions in FIG. 2A for all related steps in FIG. 2B, and details are not described again.

Further, in the foregoing step 203, to reduce the processing burden of the consensus node, a corresponding timer may be started when the consensus node receives the anchor transaction and starts monitoring. If the timer does not detect, within specified duration, that the data is modified, the invalid anchor transaction may be broadcasted, and the consensus node no longer performs monitoring. The specified duration may be set by a person skilled in the art based on an actual case. In a possible scenario, the consensus node does not detect, within the specified duration, that the data is modified, and the association transaction has been successfully submitted before the specified duration of the timer ends. In this case, the consensus node no longer needs to monitor the anchor transaction. To prevent the anchor transaction from subsequent malicious use, the consensus node may broadcast the invalid anchor transaction to the nodes on the blockchains on which the plurality of transactions occur.

It should be noted that, (1) numbers of the foregoing steps are merely examples of indication of an execution process, and sequences of the steps are not specifically limited in this application. (2) Step 203 and step 204 may occur at any time after step 202 and before step 207, and this is not specifically limited. (3) In FIG. 2A and FIG. 2B, a case in which there are only two blockchains (the blockchain 1 and the blockchain 2) is used as an example. During implementation, there may be more than two blockchains (the blockchain 1, the blockchain 2, . . . , the blockchain N), and refer to the foregoing descriptions for an implementation process when there are more than two blockchains.

Embodiment 2

Figure 4A:
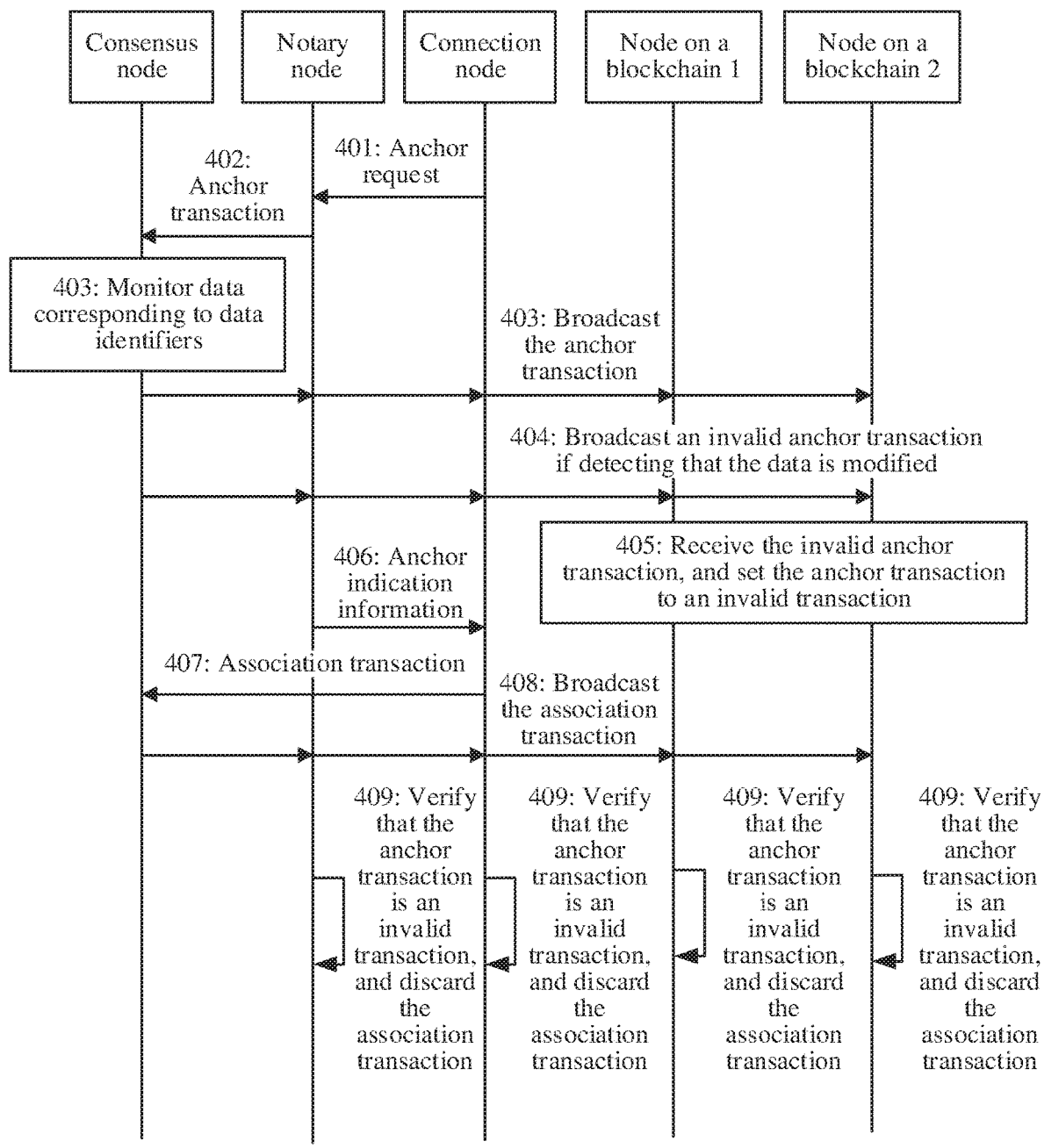
FIG. 4A is a schematic flowchart of a cross-chain transaction according to Embodiment 2 of this application.

FIG. 4A is a schematic flowchart corresponding to a cross-chain transaction method according to this application. As shown in FIG. 4A, the method includes the following steps.

Step 401: A connection node generates an anchor request corresponding to a plurality of transactions based on the plurality of associated transactions, and sends the anchor request to a notary node, where the anchor request includes data identifiers of the plurality of transactions, identifiers of blockchains on which the plurality of transactions occur, and an anchor version number.

In this application, the plurality of associated transactions may carry a same association identifier. After generating the anchor request corresponding to the plurality of transactions, the connection node may establish and store a correspondence between an identifier of the anchor request and the association identifier carried in the plurality of transactions. There may be a plurality of storage manners, for example, storage in a form of a data table, as shown in Table 2.

TABLE 2

Example of a correspondence between an association identifier of a plurality of transactions and an identifier of an anchor request

| Association identifier | Identifier of an anchor transaction |
|---|---|
| Association identifier 1 | Anchor request 1 |
| Association identifier 2 | Anchor request 2 |
| ... | ... |

Step 402: After receiving the anchor request sent by the connection node, the notary node generates an anchor transaction corresponding to the anchor request, and sends the anchor transaction to a consensus node, where the anchor transaction includes the data identifiers of the plurality of transactions, the identifiers of the blockchains on which the plurality of transactions occur, and the anchor version number.

Herein, after receiving the anchor request, the notary node may verify whether the anchor version number in the anchor request is the same as that in a local ledger, and if the anchor version number in the anchor request is the same as that in the local ledger, generates the anchor transaction corresponding to the anchor request, and executes a subsequent procedure, or if the anchor version number in the anchor request is not the same as that in the local ledger, returns a message indicating invalid data to the connection node and ends the procedure.

In this application, after generating the anchor transaction corresponding to the anchor request, the notary node may establish and store a correspondence between the identifier of the anchor request and the identifier of the anchor transaction, as shown in Table 3.

TABLE 3

Example of a correspondence between an identifier of an anchor request and an identifier of an anchor transaction

| Identifier of an anchor request | Identifier of an anchor transaction |
|---|---|
| Anchor request 1 | Anchor transaction 1 |
| Anchor request 2 | Anchor transaction 2 |
| ... | ... |

Step 403: The consensus node receives the anchor transaction, sends, based on the identifiers of the blockchains on which the plurality of transactions occur, the anchor transaction to nodes on the blockchains on which the plurality of transactions occur, and monitors data corresponding to the data identifiers.

Step 404: The consensus node broadcasts an invalid anchor transaction to the nodes on the blockchains on which the plurality of transactions occur if detecting that the data corresponding to the data identifiers is modified, where the invalid anchor transaction includes identifier information of the anchor transaction, and the invalid anchor transaction is used to indicate that the anchor transaction is an invalid transaction.

Step 405: The nodes on the blockchains on which the plurality of transactions occur receive the invalid anchor transaction sent by the consensus node, and set the anchor transaction to an invalid transaction.

For example, when the nodes set the anchor transaction to an invalid transaction, the nodes may set an invalidity identifier for the anchor transaction. The invalidity identifier indicates that the anchor transaction is an invalid transaction, or setting may be performed in another manner, and this is not specifically limited.

In this application, a node may locally maintain a list of anchor transactions. The list includes the identifier of the anchor transaction and an invalidity identifier indicating that the anchor transaction is an invalid transaction. An anchor transaction with an invalidity identifier is an invalid transaction, and an anchor transaction without an invalidity identifier is a valid transaction. In this way, it can be quickly determined, by searching the list, whether the anchor transaction is a valid transaction or an invalid transaction.

It should be noted that, when the nodes set the anchor transaction to an invalid transaction, the nodes may directly delete an invalid anchor transaction from the list. In this way, the nodes search the list, and if the nodes cannot find the anchor transaction in the list, the nodes determine that the anchor transaction is an invalid transaction, and if the nodes can find the anchor transaction in the list, the nodes determine that the anchor transaction is a valid transaction.

Step 406: After receiving the anchor transaction sent by the consensus node in step 403, the notary node sends anchor indication information to an intermediate node, where the anchor indication information is used to indicate that the anchor transaction succeeds, and the anchor indication information includes the identifier of the anchor transaction and the identifier of the anchor request corresponding to the anchor transaction.

Herein, after receiving the anchor transaction, the notary node may determine the identifier of the corresponding anchor request based on the identifier of the anchor transaction and the correspondence between the identifier of the anchor transaction and the identifier of the anchor request, and further sends the anchor indication information to the intermediate node.

Step 407: The connection node receives the anchor indication information sent by the notary node, determines, based on the identifier of the anchor request, a corresponding association identifier, further generates the association transaction based on the plurality of transactions carrying the association identifier, and sends the association transaction to the consensus node, where the association transaction includes the transaction content of the plurality of transactions, the identifiers of the blockchains on which the plurality of transactions occur, and the identifier of the anchor transaction.

Step 408: The consensus node receives the association transaction, and sends, based on the identifiers of the blockchains on which the plurality of transactions occur, the association transaction to the nodes on the blockchains on which the plurality of transactions occur.

Step 409: For any node on the first blockchain of the blockchains on which the plurality of transactions occur, after receiving the association transaction, the node determines, based on the identifier of the anchor transaction included in the association transaction, that the anchor transaction is an invalid transaction, and discards the association transaction.

Figure 4B:
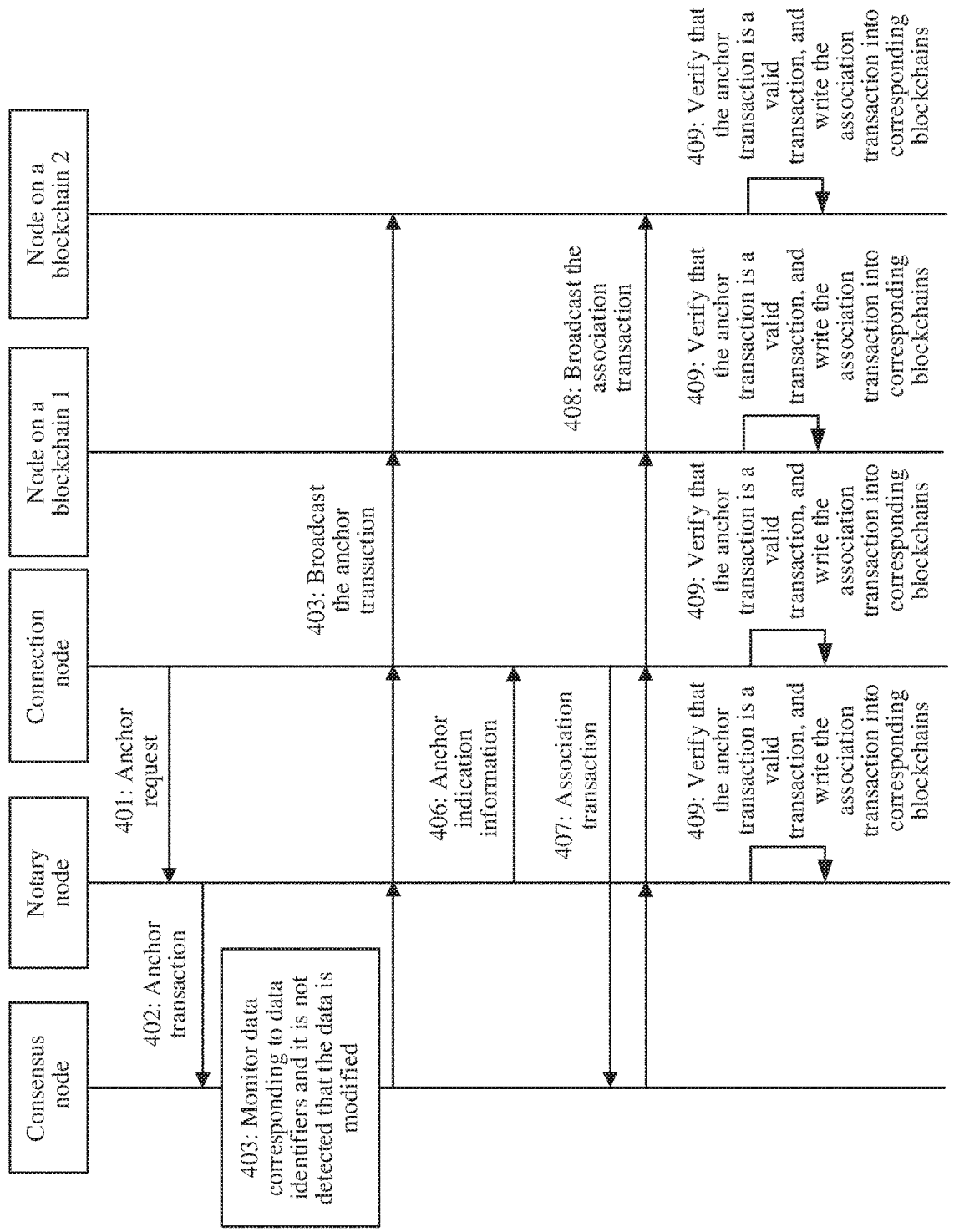
FIG. 4B is a schematic flowchart of another cross-chain transaction according to Embodiment 2 of this application.

It should be noted that in this application, in step 404, if the consensus node does not detect that the data corresponding to the data identifiers is modified, the consensus node may skip processing. In this way, in step 409, after receiving the association transaction, the nodes on the blockchains on which the plurality of transactions occur determine that the anchor transaction is a valid transaction, and write the association transaction into corresponding blockchains. For example, after receiving the association transaction, the node on the blockchain 1 determines that the anchor transaction is a valid transaction, and writes the first transaction into the blockchain after receiving the association transaction, the node on the blockchain 2 determines that the anchor transaction is a valid transaction, and writes the second transaction into the blockchain 2, and after receiving the association transaction, the notary node and the connection node (where the notary node and the connection node are both nodes common to the blockchain 1 and the blockchain 2) determine that the anchor transaction is a valid transaction, write the first transaction into the blockchain 1, and write the second transaction into the blockchain 2. Refer to FIG. 4B for a procedure in this case. By comparing a procedure shown in FIG. 4B with that in FIG. 4A, because detection results of the consensus node are different, different execution results are caused. Refer to descriptions in FIG. 4A for all related steps in FIG. 4B, and details are not described again.

Further, in the foregoing step 404, to reduce the processing burden of the consensus node, a corresponding timer may be started when the consensus node receives the anchor transaction and starts monitoring. If the timer does not detect, within specified duration, that the data is modified, the invalid anchor transaction may be broadcasted, and the consensus node no longer performs monitoring. The specified duration may be set by a person skilled in the art based on an actual case. In a possible scenario, after the consensus node broadcasts the anchor transaction to the nodes on the blockchains on which the plurality of transactions occur, the node may verify the anchor transaction. When the node receives the anchor transaction, if the anchor version number in the anchor transaction is different from that in a ledger on the node, it indicates that the anchor version number has expired. In this case, the node may directly set the anchor transaction to an invalid transaction. For the consensus node, the specified duration is set, such that after the specified duration of the timer ends, the consensus node broadcasts the invalid anchor transaction to the nodes on the blockchains on which the plurality of transactions occur, and no longer monitors the anchor transaction.

It should be noted that, (1) numbers of the foregoing steps are merely examples of indication of an execution process, and sequences of the steps are not specifically limited in this application. (2) Step 404 and step 405 may occur at any time after step 403 and before step 409, and this is not specifically limited. (3) For the foregoing step 401 and step 402, in another possible implementation, the anchor request sent by the connection node to the notary node includes only the data identifiers of the plurality of transactions and the identifiers of the blockchains on which the plurality of transactions occur, and further the notary node obtains the anchor version number based on the anchor request, and generates and sends the anchor transaction to the consensus node. (4) In FIG. 4A and FIG. 4B, a case in which there are only two blockchains (the blockchain 1 and the blockchain 2) is used as an example. During implementation, there may be more than two blockchains (the blockchain 1, the blockchain 2, . . . , the blockchain N), and refer to the foregoing descriptions for an implementation process when there are more than two blockchains.

For an implementation processes of the foregoing Embodiment 1 and Embodiment 2, it can be learned that Embodiment 2 differs from Embodiment 1 in that: (1) The notary node is used in Embodiment 2. For example, before initiating the association transaction, the connection node first sends the anchor request to the notary node, and further, the notary node sends the anchor transaction to the consensus node. The notary node that has authority is introduced, verifies the anchor version number, and generates the anchor transaction after the anchor version number is verified, such that the validity of the anchor version number can be ensured. (2) In Embodiment 2, after receiving the anchor transaction, the consensus node broadcasts, based on the identifiers of the blockchains on which the plurality of transactions occur, the anchor transaction to the nodes on the blockchains on which the plurality of transactions occur, such that the nodes on the blockchains can effectively record an implementation process of the transactions by receiving the anchor transaction. In addition, when the implementation in Embodiment 1 is used, if the consensus node maliciously broadcasts the invalid anchor transaction, the nodes on the blockchains receive only the invalid anchor transaction, and as a result cannot recognize the malicious invalid anchor transaction, leading to a transaction failure. When the implementation in Embodiment 2 is used, because the nodes on the blockchains first receive the anchor transaction, the nodes may identify, based on the anchor transaction, whether the invalid anchor transaction is malicious, thereby effectively ensuring reliable implementation of the transactions.

In addition to the differences described above, refer to corresponding steps in Embodiment 1 for implementations of the steps in Embodiment 2.

Embodiment 3

A cross-chain transaction method in this application is described below with reference to an embodiment (an implementation procedure in Embodiment 2 is used).

A scenario of this embodiment is: A user A on a blockchain 1 (Chain 1) intends to pay currency on a blockchain 2 to a user B on the blockchain 2 (Chain 2), a type of currency on the blockchain 1 is Coin 1, a type of the currency on the blockchain 2 is Coin 2, and the user A invites a user C who has assets on both the blockchain 1 and the blockchain 2 to act as an intermediary. Before a transaction starts, assets of the roles are shown in Table 4A and Table 4B.

TABLE 4A

Assets of the user A and the user C on the blockchain 1

| User | Asset data | Version number |
|---|---|---|
| A | 300 Coin 1 | 1 |
| C | 2000 Coin 2 | 1 |

TABLE 4B

Assets of the user B and the user C on the blockchain 2

| User | Asset data | Version number |
|---|---|---|
| B | 500 Coin 1 | 1 |
| C | 3000 Coin 2 | 1 |

After negotiation among the user A, the user B, and the user C, the user C needs to charge 10 Coin 1 (referred to as a transaction 1) to the user A on the blockchain 1, and pays 20 Coin 2 (referred to as a transaction 2) to user B on the blockchain 2. A function of a transfer transaction is transfer, and pseudocode of a function of a smart contract is as follows.

```
Func transfer(Acount1, Acount2, Money)
{
    A = stub.Get(Acount1)
    B = stub.Get(Acount2)
    If A > Money
        A = A − Money
        B = B + Money
        Return SUCCESS
    else
        Return FAILURE
}
```

After a final transaction is completed, a desired effect is shown in Table 5a and Table 5b.

TABLE 5a

Assets of the user A and the user C on the blockchain 1

| User | Asset data. | Version number |
|---|---|---|
| A | 290 Coin 1 | 2 |
| C | 2010 Coin 2 | 2 |

TABLE 5b

Assets of the user B and the user C on the blockchain 2

| User | Asset data | Version number |
|---|---|---|
| B | 520 Coin 1 | 2 |
| C | 2980 Coin 2 | 2 |

An implementation process of an association transaction is described below in detail.

(1) A connection node generates a corresponding anchor request based on the transaction 1 and the transaction 2 that are associated with each other, and sends the anchor request to a notary node, where the anchor request includes data identifiers (key) of the transaction 1 and the transaction 2, identifiers (chain name) of blockchains on which the transaction 1 and the transaction 2 occur, and an anchor version number. Content included in the anchor request is shown in Table 6.

TABLE 6

Example of content of an anchor request

| Type | Anchor request | |
|---|---|---|
| Chain Name | Key | Version |
| Chain 1 | A | 1 |
| Chain 1 | C | 1 |
| Chain 2 | C | 1 |
| Chain 2 | B | 1 |

(2) After receiving the anchor request, the notary node verifies whether the anchor version number in the anchor request is the same as that in a local ledger, and if the anchor version number in the anchor request is not the same as that in the local ledger, sends a message indicating invalid data to the connection node and ends a procedure, or if the anchor version number in the anchor request is the same as that in the local ledger, generates an anchor transaction (Tx 1) corresponding to the anchor request based on the anchor request, and sends the anchor transaction to the consensus node. The anchor transaction includes the data identifiers (key) of the transaction 1 and the transaction 2, the identifiers (chain name) of the blockchains on which the transaction 1 and the transaction 2 occur, and the anchor version number. Content included in the anchor transaction is shown in Table 7.

TABLE 7

Example of transaction content of an anchor transaction

| Tx ID | anchorxxxxxxxxxxxx0001 | | |
|---|---|---|---|
| Type | ANCHOR | | |
| Content | Chain 1 | A | 1 (version number here) |
| | Chain 1 | C | 1 |
| | Chain 2 | C | 1 |
| | Chain 2 | B | 1 |

(4) After receiving the anchor transaction, the consensus node starts to monitor a write operation on data corresponding to the data identifiers in a subsequent transaction, and broadcasts the anchor transaction to A nodes on the blockchain 1 and the blockchain 2.

(5) After receiving the anchor transaction broadcasted from the consensus node, the notary node sends anchor indication information to the connection node, where the anchor indication information includes an identifier of the anchor transaction and an identifier of the anchor request corresponding to the anchor transaction, and the notary node provides a signature.

(6) After receiving the anchor indication information, the connection node obtains, based on the identifier of the anchor request, the transaction 1 and the transaction 2 that correspond to the anchor request, further generates an association transaction (Tx 2) based on the transaction 1 and the transaction 2, and sends the association transaction to the consensus node. Content in the association transaction is shown in Table 8.

TABLE 8

Example of content of an association transaction

| Tx ID | xxxxxxxxxxxxxxxx0002 | | |
|---|---|---|---|
| Type | TRANSACTION | | |
| Anchor Tx | anchorxxxxxxxxxxxx0001 | | |
| Content | Chain 1 invoke transfer (A, C, 10) | | |
| | Chain 2 invoke transfer (C, B, 20) | | |
| ReadSet | Chain 1 | A | 1 (version number here) |
| | Chain 1 | C | 1 |
| | Chain 2 | C | 1 |
| | Chain 2 | B | 1 |
| WriteSet | Chain 1 | A | 290 (data here) |
| | Chain 1 | C | 2010 |
| | Chain 2 | B | 520 |
| | Chain 2 | C | 2980 |

(7) The consensus node broadcasts the association transaction to all the nodes on the blockchain 1 and the blockchain 2.

(8) When receiving the association transaction, in addition to normal verification of a transaction format, a signature, and the like (the node of each blockchain verifies only content related to the a blockchain on which the node is located), the nodes on the blockchain 1 and the blockchain 2 further need to verify whether the anchor transaction corresponding to the association transaction is a valid transaction; if the anchor transaction corresponding to the association transaction is a valid transaction, the node on the blockchain 1 writes the transaction 1 into the blockchain 1, and the node on the blockchain 2 writes the transaction 2 into the blockchain 2.

At this time, the transaction 1 and the transaction 2 are successfully submitted simultaneously.

In the foregoing process, because the consensus node does not monitor a write operation on the anchor data in a subsequent transaction, the transaction 1 and the transaction 2 are successfully submitted simultaneously. It is assumed that there is another transaction 3 that conflicts with (that is, same data needs to be modified) the association transaction between (5) to (8) in the foregoing, and the transaction 3 reaches the consensus node before the association transaction for broadcasting. A format of the transaction 3 is shown in Table 9.

TABLE 9

Example of Format of Transaction 3

| Tx ID | xxxxxxxxxxxxxxxx0003 | | |
|---|---|---|---|
| Type | TRANSACTION | | |
| Content | Chain 1 invoke transfer (A, D, 10) | | |
| ReadSet | Chain 1 | A | 1 (version number here) |
| | Chain 1 | D | 1 |
| Write Set | Chain 1 | A | 290 (value here) |
| | Chain 1 | D | 110 |

In this way, after the foregoing step (4), a corresponding procedure is as follows.

(4A) When receiving the transaction 3 (Tx 3), and detecting that the transaction 3 modifies anchor data Chain 1/A in the anchor transaction, the consensus node immediately adds a transaction 4 (Tx 4) of an invalid anchor transaction separately to the blockchain 1 and the blockchain 2 included in the anchor transaction after recording the transaction 3 into a queue of transactions to be broadcasted of the blockchain 1. A format of the transaction 4 is shown in Table 10.

TABLE 10

Example of the format of the transaction 4

| Tx ID | invalidxxxx0004 |
|---|---|
| Type | IVALIDANCHOR |
| ANCHORTX | anchorxxxxxxxxxxx0001 |

In addition, the consensus node updates the local data monitoring table, deletes the anchor transaction (Tx 1) from the data monitoring table, and no longer monitors a data change in the anchor transaction.

(4B) After receiving the transaction 4 (Tx 4), the nodes on the blockchain 1 and the blockchain 2 find the Tx 1 in the locally maintained list of anchor transactions based on the identifier (Tx 1) of the anchor transaction included in the transaction 4, and mark the Tx 1 as invalid (or deletes the Tx 1 from the list).

(4c) The nodes receive the association transaction (Tx 2) sent by the consensus node, search the list of anchor transactions based on the identifier of the anchor transaction (Tx 1) included in the association transaction, determine the anchor transaction as an invalid transaction, and further discard the association transaction without writing the association transaction into the blockchains maintained by the nodes. In this case, the transaction 1 and the transaction 2 fail to be submitted simultaneously.

For the foregoing method procedure, this application further provides a server. Defer to the foregoing method procedure for an implementation of the server.

Figure 5:
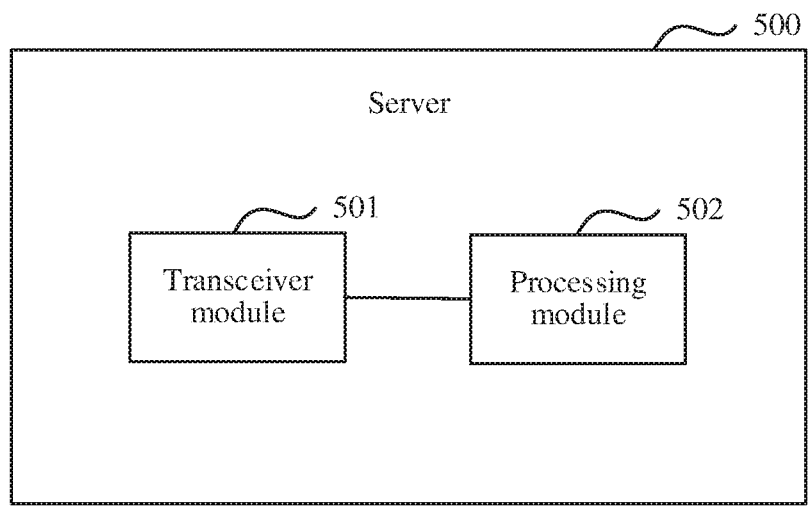
FIG. 5 is a schematic structural diagram of a first server according to this application.

This application provides a first server. The server is configured to implement a procedure or step performed by any one of a connection node, a node on the blockchain 1, a node on the blockchain 2, . . . , and a node on the blockchain N in the method embodiment shown in FIG. 2A, FIG. 2B, FIG. 4A, and FIG. 4B. Referring to FIG. 5, a server 500 may include a transceiver module 501 and a processing module 502.

The transceiver module 501 is configured to receive an association transaction sent by a consensus node, where the association transaction includes transaction content of a plurality of transactions, identifiers of blockchains on which the plurality of transactions occur, and an identifier of an anchor transaction, and the first blockchain is any blockchain of the blockchains on which the plurality of transactions occur.

The processing module 502 is configured to write a transaction that occurs in the first blockchain into the first blockchain based on the identifiers of the blockchains on which the plurality of transactions occur if determining, based on the identifier of the anchor transaction, that the anchor transaction is a valid transaction.

Figure 6:
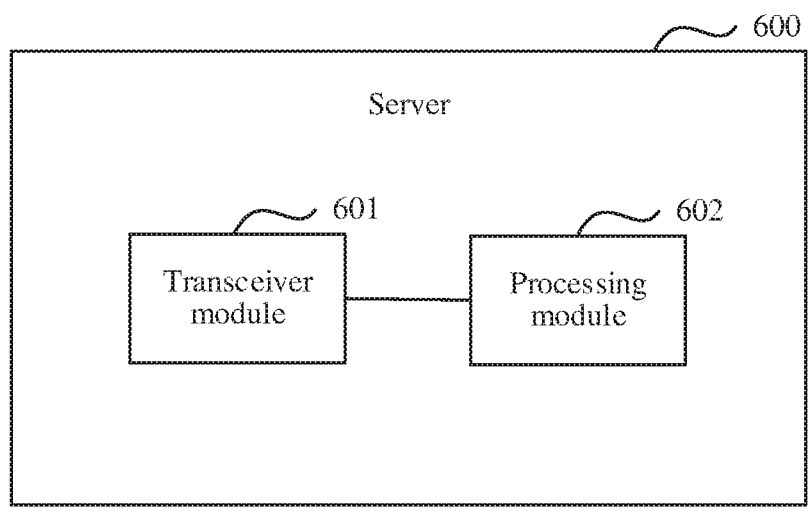
FIG. 6 is a schematic structural diagram of a second server according to this application.

This application provides a second server. The server is configured to implement a procedure or step performed by a consensus node in the method embodiment shown in FIG. 2A, FIG. 2B, FIG. 4A, and FIG. 4B. Referring to FIG. 6, a server 600 may include a transceiver module 601 and a processing module 602.

The transceiver module 601 is configured to receive an anchor transaction sent by a node, where the anchor transaction includes data identifiers of the plurality of transactions, identifiers of blockchains on which the plurality of transactions occur, and an anchor version number.

The processing module 602 is configured to: monitor data corresponding to the data identifiers, and broadcast, using the transceiver module, an invalid anchor transaction to nodes on the blockchains on which the plurality of transactions occur if detecting that the data corresponding to the data identifiers is modified, where the invalid anchor transaction includes identifier information of the anchor transaction, and the invalid anchor transaction is used to indicate that the anchor transaction is an invalid transaction.

It should be noted that, in this embodiment of this application, module division is exemplary, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 7:
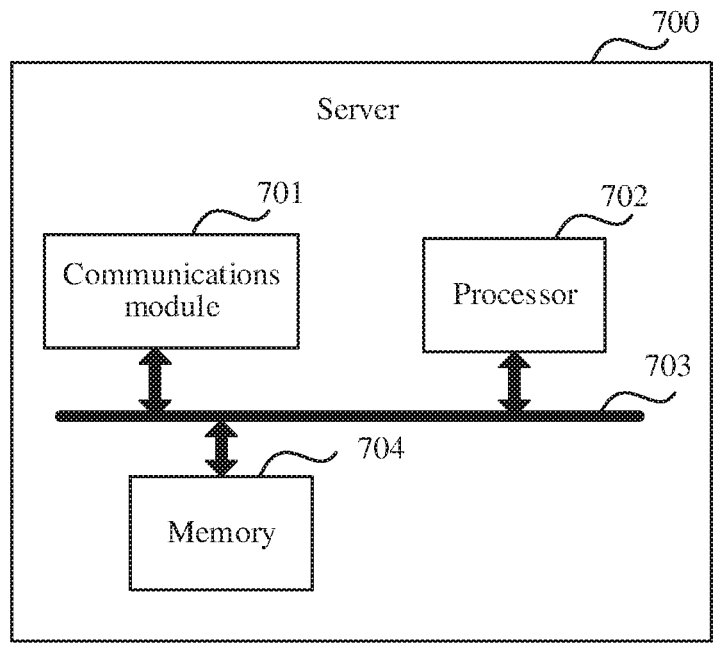
FIG. 7 is a schematic structural diagram of a third server according to this application.

This application provides a third server. The server is configured to implement a procedure or step performed by any one of a connection node, a node on the blockchain 1, a node on the blockchain 2, . . . , and a node on the blockchain N in the method embodiment shown in FIG. 2A, FIG. 2B, FIG. 4A, and FIG. 4B. The server implements a function of the server 500 shown in FIG. 5. As shown in FIG. 7, a communications apparatus 700 includes a communications module 701 and a processor 702.

The communications module 701 is configured to communicatively interact with another device, where the communications module 701 may be an RF circuit, a Wi-Fi module, a communications interface, a Bluetooth module, or the like.

The processor 702 is configured to implement a function of the processing module in FIG. 5.

Optionally, the communications apparatus may further include the memory 704, configured to store a program, and the like. The program may include program code, and the program code includes an instruction. The memory 704 may include a RAM, and may further include a non-volatile memory, for example, at least one magnetic disk memory. The processor 702 executes an application program stored in the memory 704, to implement the foregoing function.

In a possible manner, the communications module 701, the processor 702, and the memory 704 may be connected to each other using the bus 703. The bus 703 may be a bus of a peripheral component interconnect (PCI) standard, a bus with an extended industry standard architecture (EISA), or the like. The bus 703 may include an address bus, a data bus, a control bus, and the like.

Figure 8:
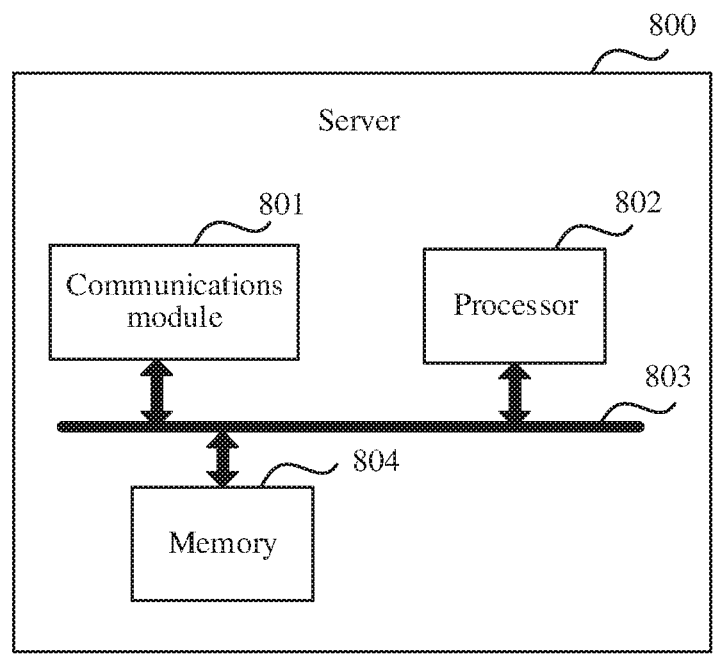
FIG. 8 is a schematic structural diagram of a fourth server according to this application.

This application further provides a fourth server. The server is configured to implement a procedure or step performed by a consensus node in the method embodiment shown in FIG. 2A, FIG. 2B, FIG. 4A, and FIG. 4B. The server implements a function of the server 600 shown in FIG. 6. As shown in FIG. 8, a communications apparatus 800 includes a communications module 801 and a processor 802.

The communications module 801 is configured to communicatively interact with another device, where the communications module 801 may be an RF circuit, a Wi-Fi module, a communications interface, a Bluetooth module, or the like.

The processor 802 is configured to implement a function of the processing module in FIG. 6.

Optionally, the communications apparatus may further include the memory 804, configured to store a program, and the like. The program may include program code, and the program code includes an instruction. The memory 804 may include a RAM, and may further include a non-volatile memory, for example, at least one magnetic disk memory. The processor 802 executes an application program stored in the memory 804, to implement the foregoing function.

In a possible manner, the communications module 801, the processor 802, and the memory 804 may be connected to each other using the bus 803. The bus 803 may be a bus of a peripheral component interconnect (PCI) standard, a bus with an extended industry standard architecture (EISA), or the like. The bus 803 may include an address bus, a data bus, a control bus, and the like.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a disk memory, a CD-ROM, an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a special-purpose computer, an embedded processor, or a processor of any other programmable data processing device to generate a machine, such that the instructions executed by a computer or a processor of any other programmable data processing device generate an apparatus for implementing a specific function in one or more procedures in the flowcharts and/or in one or more blocks in the block diagrams.

These computer program instructions may be stored in a computer readable memory that can instruct the computer or any other programmable data processing device to work in a specific manner, such that the instructions stored in the computer readable memory generate an article of manufacture that includes an instruction apparatus. The instruction apparatus implements a specific function in one or more procedures in the flowcharts and/or in one or more blocks in the block diagrams.

These computer program instructions may be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more procedures in the flowcharts and/or in one or more blocks in the block diagrams.

Obviously, a person skilled in the art can make various modifications and variations to the embodiments of the present disclosure without departing from the spirit and scope of this application. In this way, this application is intended to cover these modifications and variations to the embodiments of the present disclosure provided that they fall within the scope of protection defined by the following claims and their equivalent technologies.

What is claimed is:

1. A cross-chain transaction method, comprising:
receiving, by a node, an association transaction from a consensus node, wherein the association transaction comprises transaction content of a plurality of transactions, identifiers of blockchains on which the plurality of transactions occurs, and an identifier of an anchor transaction, wherein the node is any node on a first blockchain, and wherein the first blockchain is any blockchain of the blockchains on which the plurality of transactions occurs;
determining, by the node, whether the anchor transaction is valid, wherein the anchor transaction comprises data identifiers of the plurality of transactions, the identifiers of the blockchains on which the plurality of transactions occurs, and an anchor version number; and
writing, by the node, a transaction that occurs in the first blockchain into the first blockchain based on the identifiers of the blockchains when the anchor transaction is a valid transaction.

2. The cross-chain transaction method according to claim 1, wherein before determining whether the anchor transaction is an invalid transaction, the cross-chain transaction method further comprises:
receiving, by the node, an invalid anchor transaction from the consensus node, wherein the invalid anchor transaction comprises the identifier of the anchor transaction; and
setting, by the node, the anchor transaction to the invalid transaction based on the invalid anchor transaction.

3. The cross-chain transaction method according to claim 1, wherein before receiving the association transaction from the consensus node, the cross-chain transaction method further comprises:
receiving, by the node, the anchor transaction from the consensus node; and
writing the anchor transaction into the first blockchain.

4. The cross-chain transaction method according to claim 3, wherein the node is common to the blockchains on which the plurality of transactions occurs, and wherein before receiving the association transaction, the cross-chain transaction method further comprises:
sending, by the node, the anchor transaction corresponding to the plurality of transactions to the consensus node; and
sending, by the node, the association transaction to the consensus node after determining that the anchor transaction succeeds.

5. The cross-chain transaction method according to claim 4, wherein sending the anchor transaction to the consensus node comprises sending, by the node, an anchor request corresponding to the plurality of transactions to a notary node, and wherein the anchor request requests the notary node to generate the anchor transaction and send the anchor transaction to the consensus node.

6. A cross-chain transaction method, comprising:
receiving, by a consensus node, an anchor transaction from a node, wherein the anchor transaction comprises data identifiers of a plurality of transactions and identifiers of blockchains on which the plurality of transactions occurs, and wherein the node is a common node to the blockchains;
monitoring, by the consensus node, data corresponding to the data identifiers;
detecting whether the data corresponding to the data identifiers is modified; and
broadcasting an invalid anchor transaction to nodes on the blockchains on which the plurality of transactions occurs in response to detecting that the data corresponding to the data identifiers is modified, wherein the invalid anchor transaction comprises identifier information of the anchor transaction, and wherein the invalid anchor transaction indicates that the anchor transaction is an invalid transaction.

7. The cross-chain transaction method according to claim 6, wherein the anchor transaction further comprises an anchor version number, and wherein detecting whether the data is modified by:
receiving, by the consensus node, a second transaction, wherein the second transaction is not associated with the plurality of transactions, and wherein the second transaction comprises a version number of the data corresponding to the data identifiers; and
detecting, by the consensus node, that the data is modified in response to determining that the version number comprised in the second transaction is different from the anchor version number.

8. The cross-chain transaction method according to claim 6, wherein after receiving the anchor transaction from the node, the cross-chain transaction method further comprises broadcasting, by the consensus node based on the identifiers of the blockchains on which the plurality of transactions occurs, the anchor transaction to nodes on blockchains on which anchor data is located.

9. The cross-chain transaction method according to claim 8, wherein after broadcasting the anchor transaction to the nodes, the cross-chain transaction method further comprises:
receiving, by the consensus node, an association transaction from the node, wherein the association transaction comprises transaction content of the plurality of transactions, the identifiers of the blockchains on which the plurality of transactions occurs, and an identifier of the anchor transaction; and
broadcasting, by the consensus node based on the identifiers of the blockchains, the association transaction to the nodes on the blockchains on which the plurality of transactions occurs.

10. A server on which any node on a first blockchain is located, wherein the server comprises:
a transceiver module configured to receive an association transaction from a consensus node, wherein the association transaction comprises transaction content of a plurality of transactions, identifiers of blockchains on which the plurality of transactions occurs, and an identifier of an anchor transaction, wherein the first blockchain is any blockchain of the blockchains on which the plurality of transactions occurs, and wherein the anchor transaction comprises data identifiers of the plurality of transactions, identifiers of blockchains on which the plurality of transactions occurs, and an anchor version number; and
a processing module configured to write a transaction that occurs in the first blockchain into the first blockchain based on the identifiers of the blockchains on which the plurality of transactions occurs when determining, based on the identifier of the anchor transaction, that the anchor transaction is a valid transaction.

11. The server according to claim 10, wherein the server discards the association transaction when determining that the anchor transaction is an invalid transaction.

12. The server according to claim 11, wherein the transceiver module is further configured to receive an invalid anchor transaction from the consensus node, wherein the invalid anchor transaction comprises the identifier of the anchor transaction, and wherein the processing module is configured to set the anchor transaction to the invalid transaction based on the invalid anchor transaction.

13. The server according to claim 10, wherein the transceiver module is further configured to receive the anchor transaction from the consensus node before receiving the association transaction from the consensus node, and wherein the processing module is further configured to write the anchor transaction into the first blockchain.

14. The server according to claim 13, wherein the server is a server on which a node common to the blockchains on which the plurality of transactions occurs is located, and wherein before receiving the association transaction from the consensus node, the transceiver module is further configured to:
send the anchor transaction corresponding to the plurality of transactions to the consensus node, wherein the anchor transaction comprises data identifiers of the plurality of transactions, the identifiers of the blockchains on which the plurality of transactions occurs, and an anchor version number; and
send the association transaction to the consensus node after determining that the anchor transaction succeeds.

15. The server according to claim 14, wherein the transceiver module is further configured to send, by the node, an anchor request corresponding to the plurality of transactions to a notary node, and wherein the anchor request requests the notary node to generate the anchor transaction and send the anchor transaction to the consensus node.

16. The server according to claim 15, wherein the transceiver module is configured to:
receive anchor indication information from the notary node, wherein the anchor indication information indicates that the anchor transaction succeeds, and wherein the anchor indication information comprises the identifier of the anchor transaction and an identifier of the anchor request;
determine the plurality of transactions corresponding to the anchor request based on the identifier of the anchor request; and
send the association transaction to the consensus node based on the plurality of transactions.

17. A server on which a consensus node is located, wherein the server comprises:
a transceiver module configured to receive an anchor transaction from a node, wherein the anchor transaction comprises data identifiers of a plurality of transactions, identifiers of blockchains on which the plurality of transactions occurs, and an anchor version number, and wherein the node is a common node to the block chains; and a processing module configured to:
- monitor data corresponding to the data identifiers; and
- broadcast, using the transceiver module, an invalid anchor transaction to nodes on the blockchains on which the plurality of transactions occurs in response to detecting that the data corresponding to the data identifiers is modified, wherein the invalid anchor transaction comprises identifier information of the anchor transaction, and wherein the invalid anchor transaction indicates that the anchor transaction is an invalid transaction.

18. The server according to claim 17, wherein the anchor transaction further comprises an anchor version number, wherein the transceiver module is further configured to receive another transaction, wherein the other transaction is a transaction that is not associated with the plurality of transactions, wherein the other transaction comprises a version number of the data corresponding to the data identifiers, and wherein the processing module is configured to detect that the data corresponding to the data identifiers is modified in response to determining that the version number in the other transaction is different from the anchor version number.

19. The server according to claim 17, wherein after receiving the anchor transaction from the node, the transceiver module is further configured to broadcast, based on the identifiers of the blockchains on which the plurality of transactions occurs, the anchor transaction to nodes on blockchains on which anchor data is located.

20. The server according to claim 19, wherein after broadcasting the anchor transaction to the nodes on the blockchains on which the plurality of transactions occurs, the transceiver module is further configured to:
- receive an association transaction from the node, wherein the association transaction comprises transaction content of the plurality of transactions, the identifiers of the blockchains on which the plurality of transactions occurs, and an identifier of the anchor transaction; and
- broadcast, based on the identifiers of the blockchains on which the plurality of transactions occurs, the association transaction to the nodes on the blockchains on which the plurality of transactions occurs.

* * * * *